Patented Dec. 14, 1948

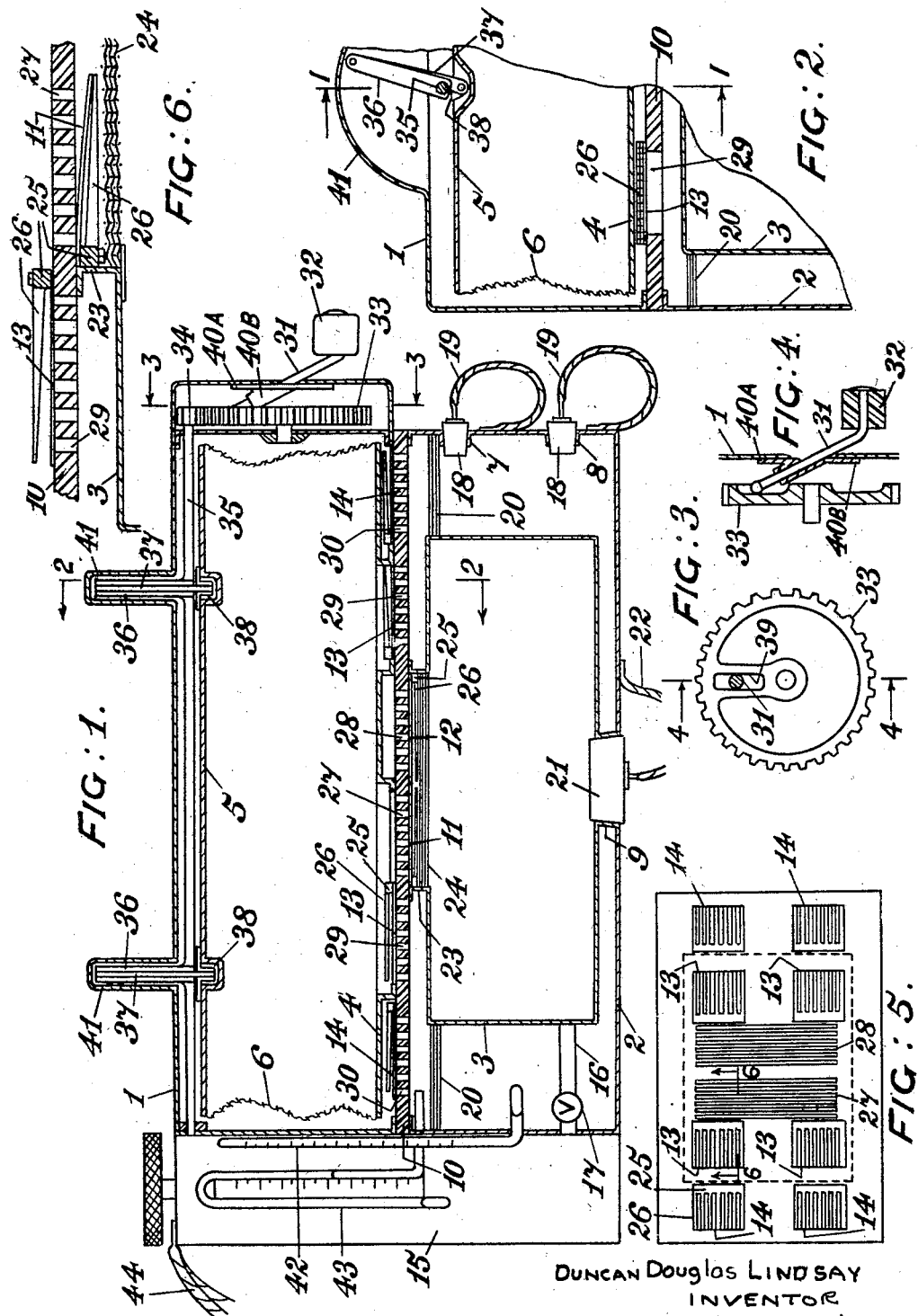

2,456,562

UNITED STATES PATENT OFFICE 2,456,562

MANUALLY OPERATED VAPOR COMPRESSION SEA WATER STILL

Duncan D. Lindsay, Scunthorpe, England

Application May 7, 1946, Serial No. 667,777
In Great Britain April 13, 1944

4 Claims. (Cl. 202—205)

This invention relates to methods of and means for obtaining drinkable water from undrinkable water, especially sea water.

Hitherto the conversion of sea water into drinkable water has been effected by fuel heated stills or by mixing a chemical substance with the sea water, this substance causing some of the impurity to be precipitated, and allowing drinkable water to be obtained by decanting or filtering. Both methods are limited as to the quantity of water that can be converted, that of the former being limited by the fuel available and that of the latter by the amount of chemical available, the amount of drinking water being about thrice by volume that of the chemical substance available. Further, in the latter method the drinking water retains a considerable amount of impurity after conversion, while the conversion involves agitating for about 20 minutes.

An object of the invention is to provide a method which will render it practicable by an easily performed operation not involving the need for fuel or for chemicals to provide drinking water in unlimited quantities from undrinkable water.

Another object of the invention is to provide an apparatus for performing said method, which apparatus can be made small in size, light in weight and suitable for operation with ease by hand.

The present invention is based upon the principle that water can be evaporated rapidly by reduction of pressure in its container to a valve about or below the saturated water vapour pressure at the temperature of the water. If the saturated water vapour pressure is actually reached, or if the pressure is reduced below that value, boiling will take place.

Therefore the present invention comprises a method of obtaining drinking water from undrinkable water, especially sea water which method consists in drawing air from the space above a supply of undrinkable water so that water vapour forms in said space and transferring such vapour as it forms to another space against a pressure therein sufficient to condense the vapour in said other space as drinking water.

The present invention also comprises a method of obtaining drinking water from undrinkable water, especially sea water, such method consisting in reducing the pressure in a vessel containing undrinkable water sufficiently to produce water vapour in said vessel and pumping the water vapour from said vessel into another vessel so that the vapour pumped thereinto becomes subjected to a pressure high enough in relation to the pressure in the first-mentioned vessel to cause condensation of such vapour into drinking water in said other vessel. The method is carried out under low internal temperature conditions, that is to say a temperature range of which the upper limit is in proximity to ambient temperature; and therefore the process is to be distinguished from any process in which the vapour to be condensed is produced by heating the undrinkable water.

Hereinafter the first-mentioned vessel is called an "evaporator" and the second-mentioned vessel is called a "condenser."

Although it is possible to start the vapour-pumping process from conditions under which the condenser is at atmospheric pressure, the method preferably includes the initial step of evacuating as substantially as is practicable a closed system incorporating both the evaporator and the condenser.

The method preferably includes the automatic step of returning to the contents of the evaporator latent heat produced in the condenser by the condensation therein of the water vapour.

The invention also comprises an apparatus for producing drinking water from undrinkable water, such apparatus comprising an evaporator which is supplied with undrinkable water, means for pumping air from said evaporator so as to reduce the pressure therein and produce water vapour, a condenser and means for transferring the water vapour to the condenser against a pressure sufficient to condense the vapour as water in the condenser.

The invention also comprises an apparatus for producing drinking water from undrinkable water, such apparatus comprising a closed casing, an evaporator in said casing which is supplied with undrinkable water, a condenser in said casing to collect drinking water, and a circulating pump interconnecting said evaporator and condenser for reducing the pressure above the water surface in said evaporator, transferring from the evaporator water vapour to the condenser and producing in said condenser a pressure sufficiently higher than in the evaporator to cause condensation in the condenser of the water vapour transferred thereto.

The apparatus preferably includes an evacuating pump connected to the condenser and adapted to withdraw air from the interior of the apparatus.

The apparatus preferably is so constructed that the condenser is enclosed in the evaporator in order that latent heat due to condensation in the condenser will be returned to the evaporator.

A preferred construction of the apparatus comprises a closed casing, a lower external vessel in said casing constituting the evaporator, at least one inlet in said evaporator for undrinkable water, a lower internal vessel enclosed in the evaporator and constituting the condenser, an outlet for drinking water in said condenser, a circulating pump arranged in the upper zone of said casing, a partition between said pump and said vessels, outlet and inlet non-return valves in said cover to control the passage of vapour from the evaporator through the pump to the condenser, and an evacuating pump connected to the condenser for initial withdrawal of air from the interior of the casing.

The invention will now be described by way of example with reference to the accompanying diagrammatic drawings, in which:

Fig. 1 is a general view, mainly in section, of the apparatus, the section being approximately on the line 1—1 of Fig. 2. Fig. 2 is a fragmentary view, being a section on the line 2—2 of Fig. 1. Fig. 3 is a detail view, being a section approximately on the line 3—3 of Fig. 1. Fig. 4 is a view corresponding to Fig. 3, being a section approximately on the line 4—4 thereof. Fig. 5 is a detail view, being a top plan of a valve plate hereinafter described and being drawn to a reduced scale. Fig. 6 is a fragmentary section drawn to an enlarged scale on the line 6—6 of Fig. 5.

The apparatus shown as an example in the accompanying diagrammatic drawing includes an outer casing shown as consisting chiefly of an upper part 1 and a lower part 2. This lower part 2 is made as a vessel which constitutes the evaporator of the apparatus. The condenser of the apparatus is constituted as a vessel 3 within the evaporator 2. A circulating pump located in the upper casing part 1 comprises a base 4, a top 5 and a flexible wall 6. The evaporator 2, in the example, has two inlets 7 and 8, through which undrinkable water is supplied to the apparatus; and the condenser 3 has an outlet 9 through which drinking water is withdrawn from the apparatus. A cover constituted as a valve plate 10 is provided as a partition between the evaporator 2 and condenser 3 below and the pump 4, 5, 6 above. The valve plate is provided with valves 11, 12, 13 and 14 to control the passage of vapour from the evaporator to the pump and from the pump to the condenser. The apparatus also includes an evacuating pump 15 which is connected by a conduit 16 through a valve 17 to the condenser 3, the pump 15 serving as a means whereby air can be withdrawn from the interior of the casing 1, 2, so that the pressure therein can be reduced.

The casing parts 1 and 2 are made of thin sheet metal strong enough to withstand a pressure difference of fifteen pounds per square inch external to internal. The metal may be tinned copper in order to enhance heat conduction and the outer surface is matt and black in order to enhance the good heat-absorbing properties of the metal. The inlets 7 and 8 are each smoothly coned and each has a rubber stopper 18 which is permanently attached by a flexible tie 19 to the casing. The water space of the evaporator 2 encloses the condenser 3 at all sides and at the bottom; and this space is entirely covered on top by sheets 20 of fine-mesh wire gauze, these sheets being spaced apart.

The vessel 3 constituting the condenser may also be made of tinned copper so that it shall have good heat-conduction qualities, but the metal need only be thick enough for rigidity. The outlet 9 is smoothly coned to receive a rubber stopper 21 which is permanently attached by a flexible tie 22 to the casing. A vapour inlet extension 23 on the condenser top is fitted with sheets 24 of fine-mesh wire gauze, these sheets being spaced apart.

In the example, there are three sheets 20 and three sheets 24 and in each vessel these sheets may be spaced about two millimetres apart. These gauze sheets permit water vapour to pass from the evaporator 2 to the circulating pump and from the circulating pump to the condenser, but they serve to prevent the passage of any liquid water which may be entrained by the vapour.

The circulating pump parts 4, 5 and 6 constitute in effect a bellows. The rigid base and top parts 4 and 5 are made of any appropriate light strong material. The flexible part is made of rubberized fabric, say two-ply, and the fabric has no stiffening to give fixed lines of folding when the bellows is compressed by depression of the top 5. Moreover, there is a sufficiency of the material 6 to ensure that it is not extended when the top 5 is at the topmost limit of its stroke. The pump is double acting, the pump chambers comprising the space within the base 4, top 5 and flexible wall 6 (namely the inner chamber) and the space outside these parts enclosed by the casing 1 (namely the outer chamber.) That is to say, on the downstroke of the top 5, vapour is sucked from the evaporator 2 through the valves 14 into the outer chamber and vapour is forced from the inner chamber through the valve 11 into the condenser 3; on the upstroke, vapour is sucked from the evaporator through the valves 13 into the inner chamber and vapour is forced from the outer chamber through the valve 12 into the condenser.

The valve plate 10 in the example is about one-quarter inch thick, being made of any appropriate non-sticky material which has good heat insulation qualities, for instance cellulose acetate. The valves 11 to 14 are of non-return type, in the example—comprising flaps of single ply rubberized fabric. Each of these flaps is anchored along one side to the plate 10 by a stop 25 secured by screws to the plate 10 and formed like a comb with tyres 26 which maintain the proper positional relationship between the respective valves and their ports 27, 28, 29 and 30. For lightness, the stops may be made of plated aluminium. In the example there are one large valve 11, one large valve 12, four small valves 13 and four small valves 14. Each valve port consists of holes through the plate 10, and although these holes are shown for convenience as long slits they may have any desired form. The port areas are as large as practicable; and the area of the port 27, the area of the port 28, the area of the ports 29 and the area of the ports 30 are each equal to one another. As Figs. 1, 5 and 6 indicate, the valves 13 and 14 and their stops 25 are arranged on the upper face of the plate 10, so that vapour can pass only upwards through their ports 29 and 30; whereas the valves 11 and 12 and their stops are arranged on the lower face of the plate 10, so that vapour can pass only downwards through their ports 27 and 28.

The circulating pump is operated by hand gear comprising a rotatable cranked handle 31 with a hand-knob 32, a toothed spur wheel 33, a pinion wheel 34 meshing with the wheel 33, a rotatable crankshaft 35, to which the pinion wheel is secured, two pairs of cranks 36 on the crankshaft, and short connecting-rods 37 connecting each pair of cranks to lugs 38 on the top plate 5 of the pump. The spurwheel 33 and the shaft 35 are journalled in the casing 1. The end of the handle engages a slot 39 in the spurwheel 33 (Fig. 3). The handle 31 is not only turnable in the upper casing part 1 but is sealed where it penetrates the casing. The sealing means in the example (Figs. 1 and 4) is a rubber fixture consisting of a flange 40A bonded to the casing part 1 and a sleeve 40B bonded to the handle 31. The casing part 1 is formed with extensions 41 to provide room for the cranks 31 and rods 37. The arrangement is such that the user of the apparatus operates the circulating pump by turning the handle 33.

The entire design of the pump-operating gear and of the bellows parts 4, 5 and 6 in relation to the casing part 1 and valve plate 10 is such that all clearances are minimised, seeing that such clearances constitute dead spaces reducing the efficiency of the pump and the speed of pumping. The gearing 33, 34 is shown as a simple speed-magnifying gear, but it may be of any appropriate type giving a gear ratio of about 1 to 20.

The evacuating pump 15 is arranged on the casing 1, 2. It may be an oil-sealed plunger pump of standard type, of about one-inch internal diameter. The valve 17 is a simple tap that can be opened and closed from the exterior of the casing so as to open the pump to the condenser 3 or close it therefrom.

The apparatus also includes a thermometer 42 and a pressure gauge 43 which extend into the evaporator 2.

A lanyard 44 is secured to the apparatus to facilitate carrying the apparatus.

The apparatus is operated in the following manner:

With all three plugs 18 and 21 out and the valve 17 closed, the circulating pump 4, 5, 6 is operated by turning the handle 31 for a minute or so to warm the pump. Then the plugs 18 are inserted. A small quantity of water (for instance sea-water) is put into the condenser, by dipping or by hand. About a dessertspoonful is enough. The plug 21 is inserted, and the water is swilled round to coat the inner surface of the condenser 3 with water. The plug 21 is removed, surplus water is let out, and the plug is replaced. The plugs 18 are removed and the apparatus dipped until the evaporator 2 is filled with undrinkable water to the level of the upper plug. The lower plug is replaced under water, and the upper plug is replaced thereafter.

On the thermometer 42 the ambient temperature is read. From a table of saturated water vapour temperatures and pressures the required sub-atmospheric pressure is read. The valve 17 leading from the condenser 3 to the evacuating pump 15 is opened and the pump 15 is operated, evacuation being carried on until the required sub-atmospheric pressure is registered on the gauge 43. This may at worst be as low as about 4 millimetres of mercury, absolute pressure. The valve 17 is then closed.

The circulating pump 4, 5, 6 is operated for about a half-hour (or other time according to the capacity of the particular apparatus and the conditions) the apparatus being supported between the legs of the user and being exposed to the sun. Vapour is drawn from the evaporator 2 and forced into the condenser 3 at a pressure sufficient to ensure that the vapour is condensed. The condensation will act to decrease the pressure in the condenser, and an equilibrium condition will be reached, at which the rate of inflow of water vapour equals the rate of condensation. This equilibrium pressure will be of the order 25 millimetres of mercury absolute.

Finally the evaporator is emptied after removing the plugs 18 very gradually. The drinking water formed in the condenser 3 is emptied into a drinking cup after removal of the plug 21.

It will be noted that after the preliminary work of warming the vapour pump and evacuation by the evacuating pump, which work is negligibly light, the only energy put into the apparatus described by way of example, is that required to operate the circulating pump. It is estimated that the energy per gram of water produced at 20° C. is about 7 calories, namely about 50 foot lbs. Seeing that a man can easily work at the rate of 5 foot lbs. per second he can easily produce 180 grams (about two-thirds of a tumbler) in one-half hour.

It is notable that in the operation of the apparatus described by way of example, no heating is applied to the apparatus except such as can be derived from the user's body and from the rays of the sun. Now, as the rate of evaporation per unit of energy increases with rise in temperature, it is desirable to have the temperature in the evaporator as high as practicable. Therefore the casing 1, 2 is made matt and black and of good heat-conducting metal in order to enhance the passage of heat into the apparatus; and the user should utilise whatever heat is available from his body and the sun.

The rate of evaporation per unit of energy also increases with drop in pressure in the evaporation zone. It is for this reason that the evacuating pump 15 is provided to enable the user to reduce the pressure in the apparatus as far as practicable before starting to pump vapour from the evaporator to the condenser.

The introductory step of wetting the surface of the condenser is to induce condensation to start in the condenser, it being desirable that condensation in the circulating pump shall be avoided in order that the pump shall remain as dry as practicable.

To ensure that the speed of evaporation and the speed of condensation are high enough for efficient working, the areas of the evaporation surface of the undrinkable water and of the condensation surface are as large as practicable. This is attained in the apparatus shown by minimizing the depth of the evaporator 2 and condenser 3, within practical limits, and having maximum length and breadth.

For efficient working, it is desirable that the latent heat developed by the condensation effect shall be returned to the evaporator. In the apparatus described, this desideratum is attained by totally enclosing the condenser in the evaporator and by using for the condenser a vessel whose walls have good heat-conducting qualities.

In order to stimulate the passage of heat from the condenser to the evaporator, and to reduce the risk of freezing in the evaporator, frequent or continuous agitation of the water in the evaporator and condenser is desirable. Such agitation may be effected in the apparatus shown simply by shaking it.

The design of the apparatus is also such that the capacities of the evaporator and the condenser are more or less equal; and the port areas of the exit from the evaporator to the interior of the circulating pump, the exit from said interior to the condenser, the exit from the evaporator to the exterior of the circulating pump and the exit from said exterior to the condenser are equal to one another, as hereinbefore described.

Instructions as to the operation of the apparatus and a table of temperatures and corresponding vapour pressures can be provided on the casing of the apparatus.

As hereinbefore stated, the apparatus shown by the accompanying diagrammatic drawing is an example. The apparatus shown is open to various modifications. For instance, in order to stimulate condensation initially in the condenser in order to avoid condensation in the circulating pump, the internal surfaces of the condenser may be painted with radio-active material (say thorium paint rendered non-poisonous by a covering of lacquer) with the object of ionising the vapour therein. In order to promote the transfer of heat from the condenser to the evaporator and to avoid freezing in the apparatus, stirring devices may be provided in the evaporator and condenser such devices being mechanically connected to the vapour-pump mechanism so as to be driven in unison therewith. Provision may be made whereby the apparatus can be operated by power, say by a wave motor such as could be brought into operation by crews of dinghies and lifeboats. Such provision might consist simply in having a driving handle which is removable for substitution of a wave-motor driving wheel. In order to increase the rate at which evaporation occurs by increasing the evaporation surface area, wick may be coiled inside the evaporator and used as an absorbent of the undrinkable water.

In the event that no evacuating pump is provided or that the initial evacuation is not taken the condenser will be initially at atmospheric pressure. In this case, when the apparatus is put in operation, water will start condensing in the condenser when the partial pressure of the water vapour pumped thereinto rises somewhat above the saturated water vapour pressure for the temperature concerned. Condensation in the condenser will act to decrease the pressure and an equilibrium condition will be reached. This pressure will be atmospheric plus something of the order of 50 mm. of mercury. The work involved will be heavier than when, as in the example, the apparatus is initially evacuated.

Apparatus according to the invention, by virtue of its lightness in weight, its smallness, the ease with which it can be operated by hand and the fact that fuel is not necessary for its operation is especially suitable to be carried by aircraft for use of crews in emergency dinghies and by ships' lifeboats.

If the apparatus is designed for use in a fixed position it is preferable that the evaporator 2 should have a height about twice that of the condenser 3, the vapour inlet extension 23 being correspondingly heightened, and the horizontal dimensions of the condenser should be only slightly less than those of the evaporator. The operation should be such that the level of the undrinkable water at the end should be slightly above the top of the condenser. The reasons for these modified proportions are:

Condensation will be taking place on the inner walls of the condenser throughout the process and all over the walls. In order therefore to regain the whole of the latent heat of condensation (and it is important that one should) the evaporating undrinkable water must enclose almost totally the outer walls of the condenser.

In a portable apparatus, say for use in life-saving dinghies, the effect of regaining the latent heat can be attained by continual agitation.

I claim:

1. Apparatus for producing drinking water from sea water, said apparatus comprising a closed casing, a partition plate in said casing and dividing the latter into an upper and lower part, said lower part constituting an evaporator-vessel adapted to be filled with the sea water, a condenser-vessel mounted within said lower part, concentrically therewith, and spaced from the sides and bottom thereof and from said partition plate, so that the sea water in the evaporator substantially encloses the bottom and sides of the condenser-vessel, fine-mesh wire gauze extending between the evaporator-vessel and the condenser-vessel at the top of the latter and obviating the passage of sea water above same but allowing the passage of vapour, a manually operable double-acting bellows pump arranged in the upper part of said casing, outlet and inlet non-return valves in said partition plate to control the passage of vapour from the evaporator-vessel through the pump to the condenser-vessel, a manually operable evacuating pump mounted on the outside of said casing and connected to the condenser-vessel for initial withdrawal of air from the interior of the casing, and a closable outlet for drinking water in the bottom of the condenser-vessel and extending through the bottom of the evaporator-vessel, the arrangement being such that when the air from the casing has been withdrawn by the evacuation pump, and water-vapour forms above the evaporator-vessel, operation of the bellows-pump causes said vapour to pass from the evaporator-vessel through the pump to the condenser-vessel and to condense therein against a pressure built-up by said pump, the latent heat of condensation passing through the walls of the condenser-vessel to the sea water and heating same to assist vaporisation and being such that the apparatus is compact, portable and manually operable.

2. Apparatus for producing drinking water from sea water, said apparatus comprising an easily portable, manually operable unit, said unit comprising a closed casing, a partition plate in said casing dividing the latter into an upper and lower rectangular box-shaped part, said lower part constituting an evaporator-vessel, filling passages in one side of the evaporator-vessel whereby the said vessel can be filled by dipping into sea water, a removable stopper for each passage, a rectangular box-shaped condenser-vessel mounted within said evaporator-vessel, concentrically therewith, and spaced from the sides and bottom thereof, so that the sea water encloses the bottom and sides of the condenser-vessel, an extension on said condenser-vesel connecting the latter to said partition plate, a passage leading from the bottom of the condenser-vessel to the exterior of the bottom of the evaporator-vessel, by means of which the interior walls of the condenser-vessel can be initially coated with a small quantity of sea water to enhance subsequent condensation of vapour from the sea water in the evaporator-vessel by dipping the said passage in sea water and by means of which drinking water can subsequently run off, a removable stopper for said passage, a manually operable, double-acting bellows pump arranged in the upper part of said casing, outlet and inlet non-return valves in said partition plate to control the passage of vapour from the evaporator-vessel through the pump to the condenser-vessel, a manually operable evacuating pump mounted on the outside of said casing and connected to the condenser-vessel for initial withdrawal of air from the interior of the condenser-vessel and from the interior of the casing above the sea water level, fine-mesh wire gauze extending between the evaporator-vessel and the condenser-vessel at the top of the latter and obviating the passage of sea water above same but allowing the passage of vapour, and fine-mesh wire gauze located in the extension of the condenser-vessel to prevent the passage of impurities into the condenser-vessel, the arrangements being such that when the air from the casing has been withdrawn by the evacuating pump, and water-vapour forms above the evaporator-vessel, operation of the bellows-pump causes said vapour to pass from the evaporator-vessel through the pump to the condenser-vessel and to condense therein against a pressure built-up by said pump, the latent heat of condensation passing through the walls of the condenser-vessel to the sea water and heating same to assist vaporisation.

3. Apparatus according to claim 2, in which the volume of the bellows pump is substantially greater than the volume of the condenser-vessel.

4. Apparatus for producing drinking water from sea water, said apparatus comprising a closed casing, a partition plate in said casing and dividing the latter into an upper and lower part, said lower part constituting an evaporator-vessel adapted to be filled with the sea water, a condenser-vessel mounted within said lower part, concentrically therewith, and spaced from the sides and bottom thereof and from said partition plate, so that the sea water in the evaporator substantially encloses the bottom and sides of the condenser-vessel, fine-mesh wire gauze extending between the evaporator-vessel and the condenser-vessel at the top of the latter and obviating the passage of sea water above same but allowing the passage of vapour, a manually operable pump arranged in the upper part of said casing, outlet and inlet non-return valves in said partition plate to control the passage of vapour from the evaporator-vessel through the pump to the condenser-vessel, a manually operable evacuating pump mounted on the outside of said casing and connected to the condenser-vessel for initial withdrawal of air from the interior of the casing, and a closable outlet for drinking water in the bottom of the condenser-vessel and extending through the bottom of the evaporator-vessel, the arrangement being such that when the air from the casing has been withdrawn by the evacuating pump, and water-vapour forms above the evaporator-vessel, operation of the bellows-pump causes said vapour to pass from the evaporator-vessel through the pump to the condenser-vessel and to condense therein against a pressure built-up by said pump, the latent heat of condensation passing through the walls of the condenser-vessel to the sea water and heating same to assist vaporisation and being such that the apparatus is compact, portable and manually operable.

DUNCAN D. LINDSAY.

REFERENCES CITED

The following references are of record in the file of this patent:

UNITED STATES PATENTS

| Number | Name | Date |
|---|---|---|
| 585,943 | Waterhouse | July 6, 1897 |
| 838,195 | Lueur | Dec. 11, 1906 |
| 849,579 | Siebel | Apr. 9, 1907 |
| 1,204,716 | Thorsell | Nov. 14, 1916 |
| 1,489,009 | Röhmer et al. | Apr. 1, 1924 |
| 1,966,938 | Stone | July 17, 1934 |
| 2,185,595 | Kleinschmidt | Jan. 2, 1940 |
| 2,185,596 | Kleinschmidt | Jan. 2, 1940 |
| 2,339,862 | Kleinschmidt | Jan. 25, 1944 |
| 2,368,665 | Kohman et al. | Feb. 6, 1945 |
| 2,375,640 | Ford | May 8, 1945 |
| 2,395,004 | Kleinschmidt | Feb. 19, 1946 |

FOREIGN PATENTS

| Number | Country | Date |
|---|---|---|
| 339,020 | Italy | Apr. 14, 1936 |